United States Patent Office 2,846,481
Patented Aug. 5, 1958

2,846,481
INHIBITION OF POLYMERIZATION OF VINYL CHLORIDE BY DIARYL CARBONATES

Robert G. Roth, Edgewood, Md., and William F. Yates, Texas City, Tex., assignors to Monsanto Chemical Company, St. Louis, Mo., a corporation of Delaware No Drawing. Application December 7, 1955
Serial No. 551,504

11 Claims. (Cl. 260—652.5)

This invention relates to vinyl chloride. More specifically, this invention relates to an improved process for inhibiting the polymerization of vinyl chloride and to the novel inhibited compositions resulting therefrom.

The primary use of monomeric vinyl chloride is in the preparation of polyvinyl chloride and copolymers of vinyl chloride and other monomers. In such applications monomeric vinyl chloride of very high purity is required. Monomeric vinyl chloride, however, on standing at room temperature exhibits a tendency towards polymerization which results in a formation of solid compounds which contaminate the monomeric material. As the temperature is increased, the tendency of the monomeric vinyl chloride to polymerize is increased and greater quantities of impurities or contaminants are formed. Vinyl chloride containing such polymerized impurities is not satisfactory for most applications and such contaminated material must be repurified prior to use.

It is an object of this invention to provide an improved method for inhibiting the polymerization of vinyl chloride.

It is a further object of this invention to provide novel vinyl chloride compositions which are inhibited against polymerization.

Further objects will become apparent from the description of the invention which follows.

It has now been discovered that the polymerization of vinyl chloride can be significantly inhibited by incorporating therein a minor amount of a diaryl carbonate having the formula:

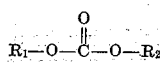

wherein $R_1$ and $R_2$ represent a phenyl radical. Vinyl chloride containing a minor amount of the aforementioned diaryl carbonates can be subjected to prolonged periods of storage without exhibiting any evidence of polymer formation.

The inhibiting effect of diaryl carbonates on vinyl chloride in accordance with this invention is determined by the following dilatometric test procedure:

A 7 mm. tube containing a 1-ml. bulb at one end is calibrated for volume per unit length and total volume to a reference mark. Approximately 20 mg. of benzoyl peroxide is weighed into a calibrated tube as described. Approximately 1 ml. of vinyl chloride is delivered into the reaction tube with a drawn delivery tube while the entire apparatus is cooled in a Dry Ice-acetone mixture. The reaction tube is then evacuated to 300–400 mm. Hg absolute and sealed. The tube is weighed to determine the exact weight of vinyl chloride in the tube.

The tube is then warmed to room temperature and shaken until the catalyst dissolves. The reaction tube is then placed in a 50° C. constant temperature bath and the initial position of the meniscus relative to the reference mark is noted and total volume calculated. As polymerization takes place the change in the position of the meniscus is followed as a function of time until about 10% of the vinyl chloride present has been converted to polymer. Using 0.855 and 1.40 g./ml. at 50° C. as the density of vinyl chloride monomer and polymer respectively, the percent polymer formed per hour, extrapolated to a standard catalyst concentration of 0.56 mole percent, is determined.

Example I

Uninhibited vinyl chloride is tested in accordance with the procedure described above. A polymerization rate of 6.25% per hour is obtained.

Example II

Vinyl chloride containing 50 p. p. m. of diphenyl carbonate is tested in accordance with the procedure described above. A polymerization rate of 5.65% per hour is obtained.

Example III

Vinyl chloride containing 200 p. p. m. of diphenyl carbonate is tested in accordance with the procedure described above. A polymerization rate of 5.38% is obtained.

Example IV

Vinyl chloride containing 500 p. p. m. of diphenyl carbonate is tested in accordance with the procedure described above. A polymerization rate of 5.38% per hour is obtained.

Example V

Vinyl chloride containing 100 p. p. m. of bis(2-methylphenyl) carbonate (a ditolyl carbonate) is tested in accordance with the procedure described above. A polymerization rate significantly less than that indicated in Example I is obtained.

Example VI

Vinyl chloride containing 100 p. p. m. of bis(3-methylphenyl) carbonate (a ditolyl carbonate) is tested in accordance with the procedure described above. A polymerization rate significantly less than that indicated in Example I is obtained.

Example VII

Vinyl chloride containing 200 p. p. m. of bis(4-methylphenyl) carbonate (a ditolyl carbonate) is tested in accordance with the procedure described above. A polymerization rate significantly less than that indicated in Example I is obtained.

Example VIII

Vinyl chloride containing 500 p. p. m. of bis(2,3-dimethylphenyl)carbonate (a dixylyl carbonate) is tested in accordance with the procedure described above. A polymerization rate significantly less than that indicated in Example I is obtained.

Example IX

Vinyl chloride containing 50 p. p. m. of bis(2,4-dimethylphenyl)carbonate (a dixylyl carbonate) is tested in accordance with the procedure described above. A polymerization rate significantly less than that indicated in Example I is obtained.

Example X

Vinyl chloride containing 200 p. p. m. of bis(2,5-dimethylphenyl)carbonate is tested in accordance with the procedure described above. A polymerization rate significantly less than that indicated in Example I is obtained.

Example XI

Vinyl chloride containing 200 p. p. m. of bis(2-nitrophenyl)carbonate is tested in accordance with the pro-

Example XII

Vinyl chloride containing 400 p. p. m. of bis(2,4-dichlorophenyl) carbonate is tested in accordance with the procedure described above. A polymerization rate significantly less than that indicated in Example I is obtained.

Example XIII

Vinyl chloride containing 200 p. p. m. of bis(4-isopropylphenyl) carbonate is tested in accordance with the procedure described above. A polymerization rate significantly less than that indicated in Example I is obtained.

Example XIV

Vinyl chloride containing 200 p. p. m. of bis(2-hydroxyphenyl) carbonate is tested in accordance with the procedure described above. A polymerization rate significantly less than that indicated in Example I is obtained.

Example XV

Vinyl chloride containing 300 p. p. m. of bis(2,4,5-tribromophenyl) carbonate is tested in accordance with the procedure described above. A polymerization rate significantly less than that indicated in Example I is obtained.

Example XVI

Vinyl chloride containing 100 p. p. m. of bis(4-2-ethylhexylphenyl) carbonate is tested in accordance with the procedure described above. A polymerization rate significantly less than that indicated in Example I is obtained.

The phenyl radicals in the diaryl carbonates used to inhibit the polymerization of vinyl chloride in accordance with this invention can be unsubstituted or substituted with one or more substituents such as alkyl, nitro, hydroxyl, halogen, etc. Diaryl carbonates of the formula $$R_1-O-\overset{\overset{O}{\|}}{C}-O-R_2$$

wherein $R_1$ and $R_2$ are selected from the group consisting of the phenyl radical and alkyl-substituted phenyl radical wherein the alkyl groups contain not more than 8 carbon atoms constitute a preferred class of inhibitors.

The diaryl carbonates of this invention exhibit their inhibiting effect on monomeric vinyl chloride over a wide range of concentrations. From about 1 to about 1000 parts by weight of the diaryl carbonate per million parts by weight of monomeric vinyl chloride have been found to be applicable. However, concentrations in the range of from about 10 parts by weight to about 500 parts by weight of the diaryl carbonate per million parts by weight of the monomeric vinyl chloride are particularly preferred. The diaryl carbonates are efficient inhibitors per se but if desired can be mixed with other known inhibitors for vinyl chloride.

This application is a continuation-in-part of our copending application Serial No. 343,522, filed March 19, 1953, now abandoned.

What is claimed is:

1. As a new composition of matter, monomeric vinyl chloride containing a minor amount of a diaryl carbonate having the formula $$R_1-O-\overset{\overset{O}{\|}}{C}-O-R_2$$

wherein $R_1$ and $R_2$ represent a radical selected from the group consisting of the phenyl radical and substituted phenyl radicals wherein the substituents are selected from the group consisting of alkyl, nitro, hydroxyl, and halogen.

2. As a new composition of matter, monomeric vinyl chloride containing a minor amount of a diaryl carbonate having the formula $$R_1-O-\overset{\overset{O}{\|}}{C}-O-R_2$$

wherein $R_1$ and $R_2$ are selected from the group consisting of the phenyl radical and alkyl-substituted phenyl radicals wherein the alkyl groups contain not more than 8 carbon atoms.

3. As a new composition of matter, monomeric vinyl chloride containing from about 1 part by weight to about 1000 parts by weight per million parts by weight of vinyl chloride of a diaryl carbonate having the formula $$R_1-O-\overset{\overset{O}{\|}}{C}-O-R_2$$

wherein $R_1$ and $R_2$ are selected from the group consisting of the phenyl radical and alkyl-substituted phenyl radicals wherein the alkyl group contains not more than 8 carbon atoms.

4. As a new composition of matter, monomeric vinyl chloride containing from about 10 parts by weight to about 500 parts by weight per million parts by weight of vinyl chloride of a diaryl carbonate having the formula $$R_1-O-\overset{\overset{O}{\|}}{C}-O-R_2$$

wherein $R_1$ and $R_2$ are selected from the group consisting of the phenyl radical and alkyl-substituted phenyl radicals wherein the alkyl group contains not more than 8 carbon atoms.

5. As a new composition of matter, monomeric vinyl chloride containing a minor amount of diphenyl carbonate.

6. As a new composition of matter, vinyl chloride containing from 1 part by weight to about 1000 parts by weight of diphenyl carbonate per million parts by weight of vinyl chloride.

7. As a new composition of matter, vinyl chloride containing from 10 parts by weight to about 500 parts by weight of diphenyl carbonate per million parts by weight of vinyl chloride.

8. As a new composition of matter, vinyl chloride containing from 10 parts by weight to about 500 parts by weight of ditolyl carbonate per million parts by weight of vinyl chloride.

9. As a new composition of matter, vinyl chloride containing from 10 parts by weight to about 500 parts by weight of dixylyl carbonate per million parts by weight of vinyl chloride.

10. A process for inhibiting the polymerization of vinyl chloride which comprises incorporating therein a minor amount of a diaryl carbonate having the formula $$R_1-O-\overset{\overset{O}{\|}}{C}-O-R_2$$

wherein $R_1$ and $R_2$ represent a radical selected from the group consisting of the phenyl radical and substituted phenyl radicals wherein the substituents are selected from the group consisting of alkyl, nitro, hydroxyl, and halogen.

11. A process for inhibiting the polymerization of vinyl chloride which comprises incorporating therein a minor amount of a diaryl carbonate having the formula $$R_1-O-\overset{\overset{O}{\|}}{C}-O-R_2$$

wherein $R_1$ and $R_2$ are selected from the group consisting of the phenyl radical and alkyl-substituted phenyl radicals wherein the alkyl group contains not more than 8 carbon atoms.

No references cited.

UNITED STATES PATENT OFFICE
CERTIFICATE OF CORRECTION

Patent No. 2,846,481                                August 5, 1958

Robert G. Roth et al.

It is hereby certified that error appears in the printed specification of the above numbered patent requiring correction and that the said Letters Patent should read as corrected below.

Column 3, lines 29 and 30, for the compound "bis(4-2-ethylhexylphenyl) carbonate" read -- bis 4-(2-ethylhexyl) phenyl carbonate --.

Signed and sealed this 9th day of December 1958.

(SEAL)
Attest:

KARL H. AXLINE                                             ROBERT C. WATSON
Attesting Officer                                        Commissioner of Patents